United States Patent [19]

Tano et al.

[11] Patent Number: 4,761,746
[45] Date of Patent: Aug. 2, 1988

[54] DYNAMIC RECONSTRUCTION METHOD FOR DISCRIMINATION NETWORK

[75] Inventors: Shunichi Tano, Machida; Motohisa Funabashi, Sagamihara; Shoichi Masui, Kawasaki; Seiji Sakaguchi, Yokohama, all of Japan

[73] Assignee: Hitachi, Ltd., Tokyo, Japan

[21] Appl. No.: 897,841

[22] Filed: Aug. 19, 1986

[30] Foreign Application Priority Data

Sep. 6, 1985 [JP] Japan ................... 60-195845

[51] Int. Cl.⁴ .................. G06F 15/46; G06F 15/18
[52] U.S. Cl. ........................ 364/513; 364/300; 364/900; 382/15
[58] Field of Search ........ 364/513, 300, 200 MS File, 364/900 MS File; 382/14, 15, 36-39

[56] References Cited

U.S. PATENT DOCUMENTS

| | | | |
|---|---|---|---|
| 4,286,330 | 8/1981 | Issacson | 364/300 X |
| 4,599,692 | 7/1986 | Tan et al. | 364/513 |
| 4,599,693 | 7/1986 | Denenberg | 364/513 |
| 4,628,435 | 12/1986 | Tashiro et al. | 364/513 X |
| 4,649,515 | 3/1987 | Thompson et al. | 364/513 |
| 4,670,848 | 6/1987 | Schramm | 364/513 |

OTHER PUBLICATIONS

Forgy-"Rete: A Fast Algorithm for the Many Pattern-/Many Object Pattern Match Problem", Artificial Intelligence, vol. 19, No. 1, 1982, pp. 17-37.

Primary Examiner—Joseph Ruggiero
Attorney, Agent, or Firm—Antonelli, Terry & Wands

[57] ABSTRACT

A dynamic network reconstruction method in which the node processing information such as a node processing volume and a ratio at which a node is satisfied is collected for all nodes to maintain an efficient network even when the characteristic of an object described in a condition clause is changed in a Rete network of a production system using the knowledge technology and the network is changed based on the node processing information.

3 Claims, 6 Drawing Sheets

FIG. 3

( PUMP A ⟋13

PRESSURE    4.5

REVOLUTION SPEED    100

DEVICE TEMPERATURE    70

( PUMP A ABNORMAL ⟋14

PUMP A    PRESSURE    < 0.5

REVOLUTION SPEED    > 300

DEVICE TEMPERATURE    > 100

| TOKEN NODE NO. | PUMP A | TURBINE C | TURBINE B | PUMP B | PUMP C | --- |
|---|---|---|---|---|---|---|
| ② | 5 | 1 | 6 | 2 | 3 | --- |
| ③ | 2 | -1 | -3 | 5 | -4 | --- |
| ④ | -5 | -2 | 6 | -1 | 3 | --- |
| ⑤ | 5 | 4 | -3 | 2 | -1 | --- |
| ⑥ | -5 | -2 | 1 | -3 | -4 | --- |

FIG. 8

| i \ j | ② | ③ | ④ | ⑤ | ⑥ |
|---|---|---|---|---|---|
| ② |  | -10 | -8 | -9 | -11 |
| ③ | 10 |  | 3 | 1 | -5 |
| ④ | 8 | -3 |  | 2 | -1 |
| ⑤ | 9 | -1 | -2 |  | -7 |
| ⑥ | 11 | 5 | 1 | 7 |  |

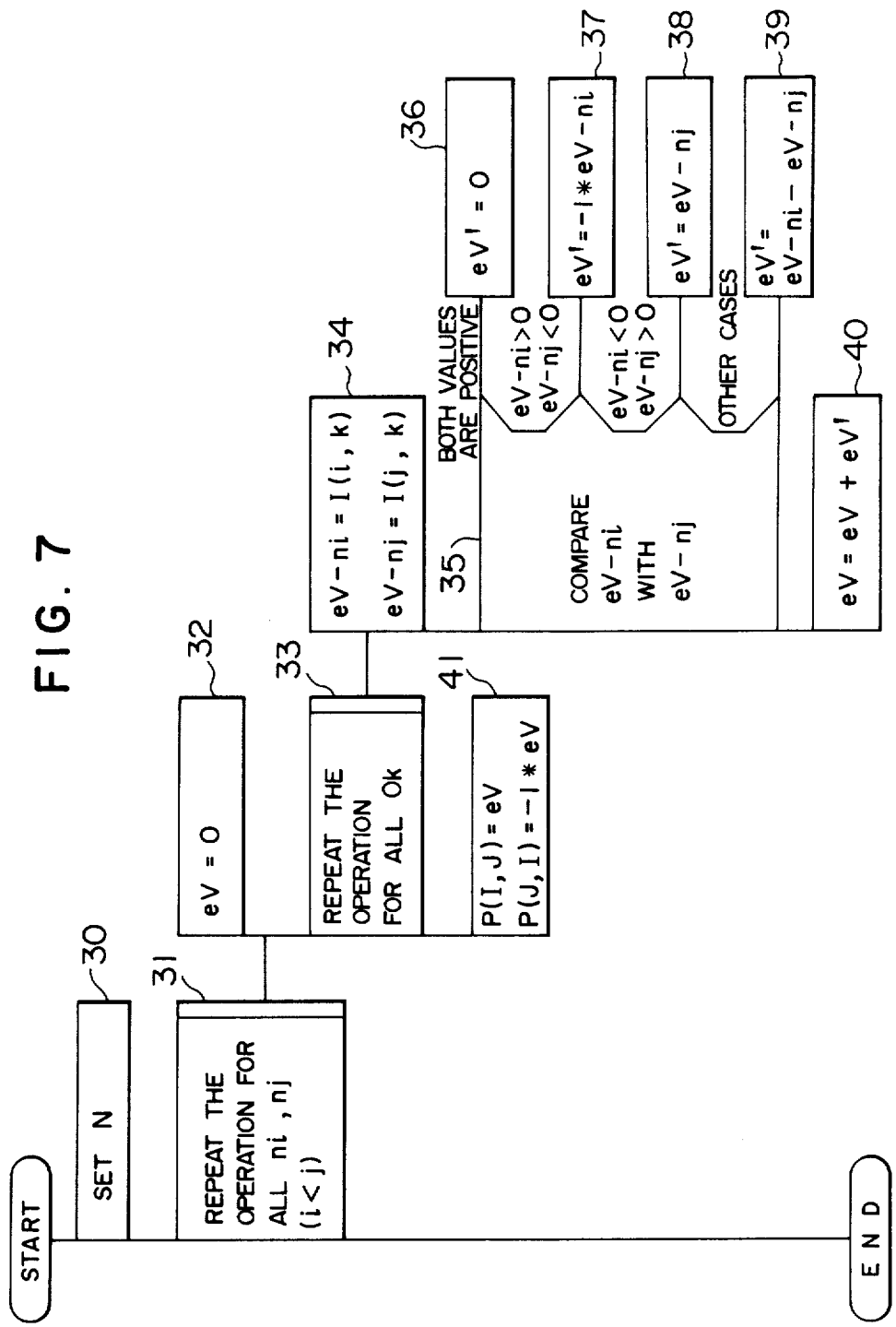

DYNAMIC RECONSTRUCTION METHOD FOR DISCRIMINATION NETWORK

BACKGROUND OF THE INVENTION

The present invention relates to a system using a network similar to a discrimination network for judging whether or not conditions are satisfied, and in particular, to a method for modifying a discrimination network suitable for a knowledge base system.

As a method for judging at a high speed whether or not conditions are satisfied, there has been known a method in which a network similar to a discrimination network is used ("Rete: A Fast Algorithm for the Many Pattern/Many Object Pattern Match Problem"; Artificial Intelligence, Vol. 19, No. 1, 1982). In this method, conditions related to tokens or objects each comprising a token name and at least a pair of an attribute name and an attribute value are converted into a network, which is used to judge whether or not the conditions are satisfied.

A condition related to a token includes a plurality of condition clauses associated with the attribute of the token and the condition clause corresponds to a node of the network. For achieving the judgment, a token is passed through the network so as to determine whether or not the token satisfies the condition clause stored in each node. If this is the case, the token is passed to the next node, otherwise, the processing is stopped. This operation is repeated for all nodes. If the processing reaches the last node, it is judged that the condition of which the name is described in the node has been satisfied. This system therefore achieves the processing to judge the conditions at a high speed.

Generally, in a condition judge method using such a network, the efficiency of the network is higher when there exists a few tokens satisfying the conditions associated with the nodes, namely, nodes related with critical or severe conditions are placed at positions in the neighborhood of a root node of the network.

In practice, however, the writer of the conditions must obtain information about how the conditions are converted into a network to properly arrange the condition clauses in the conditions, for example, condition clauses which are not likely to be satisfied by the token are located at positions in the neighborhood of the root node of the network. This imposes a heavy burden on the writer of the conditions.

For the writer, on the other hand it is difficult to find out the ratio at which each condition clause is satisfied; moreover, since such a ratio at which each node is satisfied is dynamically changed when the characteristic of the objective phenomenon varies, the efficiency of the network operation according to the conventional method in which the writer arranges the condition clauses as described above is limited.

The first problem of the prior are method is that the condition clauses are arranged or ordered by the writer of conditions and that the order is assumed to be fixed.

In the condition judge system, if the node processing information is generated at an interval of a predetermined period to compare the obtained information with the previous information, the difference therebetween can be attained. In such a case, the network can be modified (for example, the order of nodes with respect to the levels relative to the root node is rearranged). Consequently, even if the characteristic of the objective problem is changed and the satisfaction ratios of the conditions stored in the nodes are varied, an efficient network can be established in any cases by dynamically modifying the network.

However, the rearrangement of the nodes in the network is accompanied by the following problems.

First, a ratio at which a node is satisfied or a satisfaction ratio of a node strongly depends on the relationships of the node with the higher-level and lower-level nodes. For example, assume that node A is at a higher level with respect to node B and that the satisfaction ratios of nodes A and B are 0.5 and 0.2, respectively. In this case, the ratio of 0.2 is a conditional probability, and hence the network processing efficiency cannot be necessarily increased even when the levels of the nodes A and B are exchanged.

Second, rearrangement of the nodes with respect to the hierarchic level in the network is essentially reduced to a problem of combination, which requires a great number of calculations.

SUMMARY OF THE INVENTION

It is therefore an object of the present invention to provide a dynamic network reconstruction method for relieving the writer of conditions from the burden to arrange the levels of the condition clauses and for maintaining an efficient network even when the characteristic of an object written by a condition is changed.

To overcome the first problem described above, according to the present invention, the node processing information is also generated during the condition judge processing, the information including the node processing volume of the network and the satisfaction ratios of the conditions in the nodes are also generated at the same time. The network is thus reconstructed by use of the node processing information, which enables the condition clauses to be rearranged without the intervention of the writer.

The second problem is solved by the present invention as follows. Two network processing modes are provided, namely, the ordinary mode and the log mode. In the ordinary mode, the conventional network processing is executed without collecting the node processing information; whereas in the log mode, the node processing information is gathered for all nodes of the network. That is, in the log mode, even if a check results in a failure, the token is passed to the subsequent node to collect the node processing information and the processing is continued.

As described above, since the node processing information is collected for all nodes of the network, the data related to the hierarchic level relationship of the first problem can be extracted from the node processing information; moreover, the second problem can also be solved by use of a table representing favorable hierarchic relationships between nodes.

BRIEF DESCRIPTION OF THE DRAWINGS

The present invention will be apparent from the following detailed description taken in conjunction with the accompanying drawings in which:

FIG. 3 is an explanatory diagram demonstrating an example of the token;

FIG. 4 is an explanatory diagram depicting an example of a condition;

FIG. 6 is a schematic diagram showing an example of the node processing information;

FIG. 7 is a flowchart depicting a processing procedure for computing the favorable hierarchic relationships between nodes; and FIG. 8 is a schematic diagram showing an example of the table representing the favorable hierarchic relationships between nodes.

DESCRIPTION OF THE PREFERRED EMBODIMENTS

Figure 1:
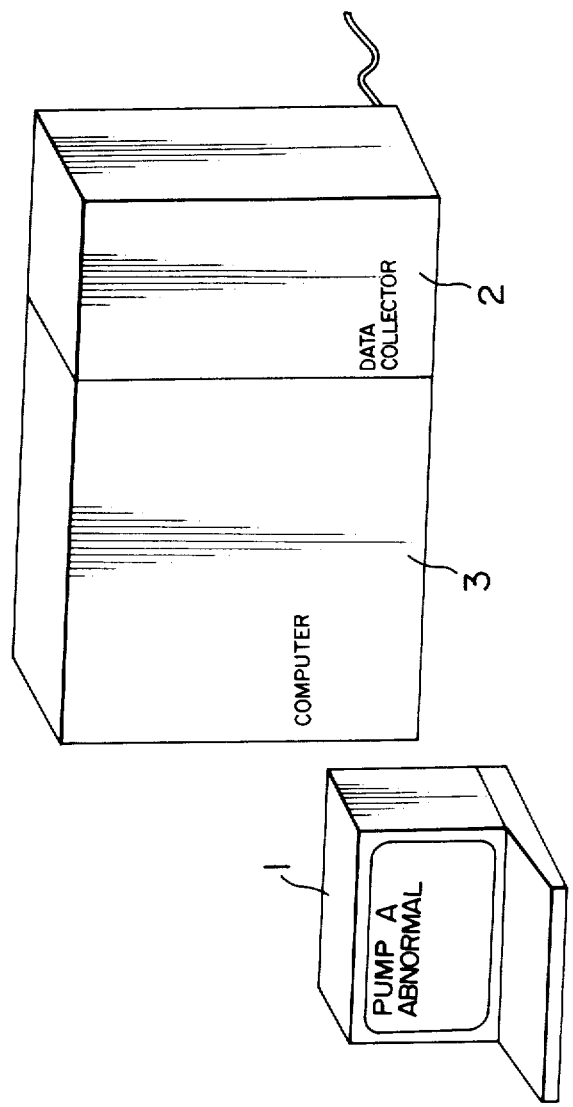
FIG. 1 is a schematic diagram illustrating a configuration of the condition judge system.

FIG. 1 is a schematic diagram showing a configuration of the condition judge system to which the present invention is applied. This system is used to monitor the operation state in a process factory and comprises a monitor TV 1 for notifying the process state to the process manager, a data collector 2, for collecting via each measuring terminal, the token, such as the state of each device in the process factory, and a computer 3 for judging whether or not conditions related to the process operation state are satisfied.

Figure 2:
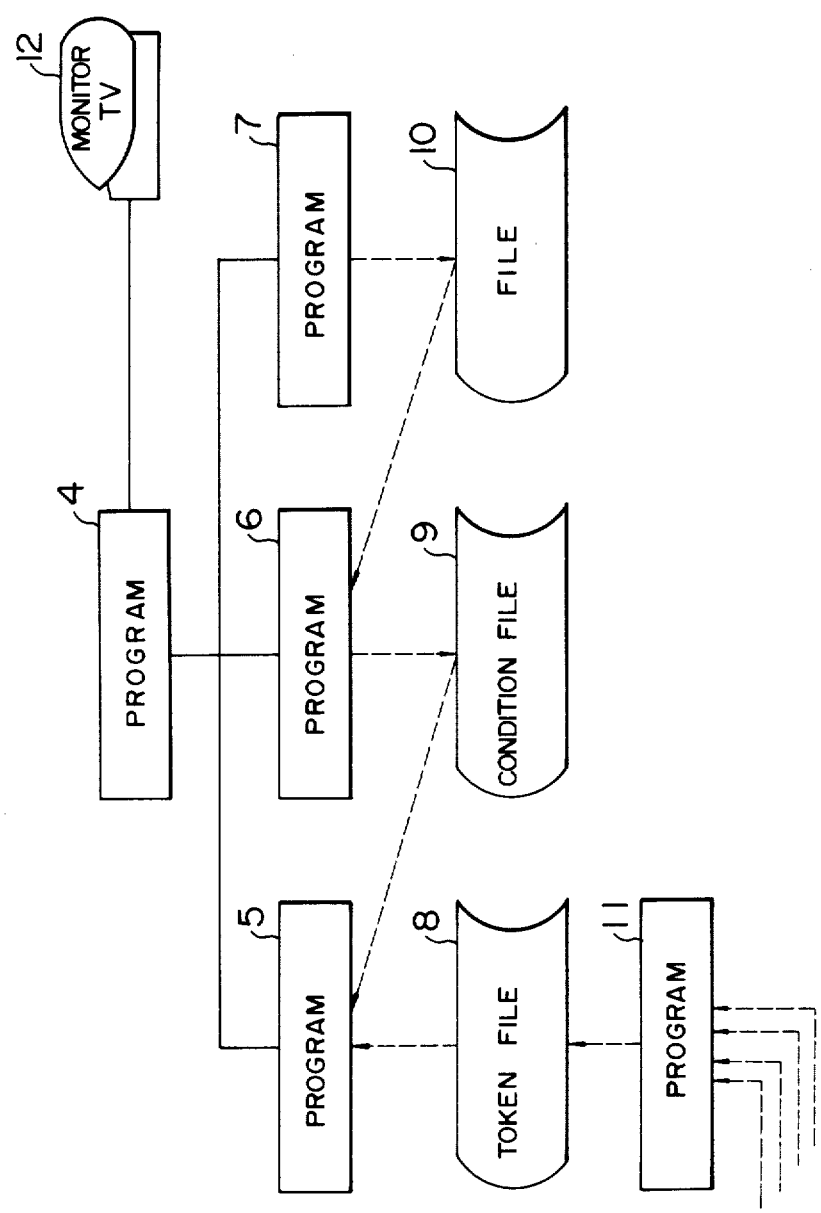
FIG. 2 is a schematic diagram showing an example of the program configuration.

FIG. 2 is a program configuration diagram showing a configuration of programs in which program 11 collects information from the measuring terminals in the process factory so as to update a token file 8. program 5 compares the content of the token file 8 and the content of a condition file 9 developed as a network to judge whether the condition is satisfied or not. A program 7 collects the processing state of each node of the network and stores the collected data as node processing information in file 10. A program 6 modifies or reconstructs the network stored in the condition file 9 by using the file containing the node processing information collected by the program 7. A program 4 outputs the condition which has been judged to be satisfied by the program 5 to a monitor TV 12 and initiates the programs 6–7 at an interval of a predetermined period to maintain an efficient network.

FIG. 3 is an explanatory diagram depicting an example of the token in which a token 13 indicates the current pressure, revolution frequency, and device temperature of pump A to be 4.5, 100, and 70°, respectively. A token, like this example, is expressed as an object or an object data including a device name representing the token name and a plurality of pairs of an attribute name and an attribute value.

On the other hand, a condition to be judged as true or false is described according to the configuration of the token. FIG. 4 is an explanatory diagram illustrating an example of a condition. A condition 14 indicates that the token name is "Pump A abnormal", the pressure of the pump A is less than 0.5, the revolution frequency thereof exceeds 300, and the device temperature is more than 100°. Here, the condition includes three condition clauses: pressure <0.5, revolution frequency >300, and device temperature >100.

In the condition judge system, a condition is judged to be satisfied or not by comparing the current value stored in the token with the content of the condition, and the condition name of the condition satisfied is outputted to the monitor TV 12.

To compare the condition with the token, the condition is converted into a network and the token is passed through the network.

Figure 5:
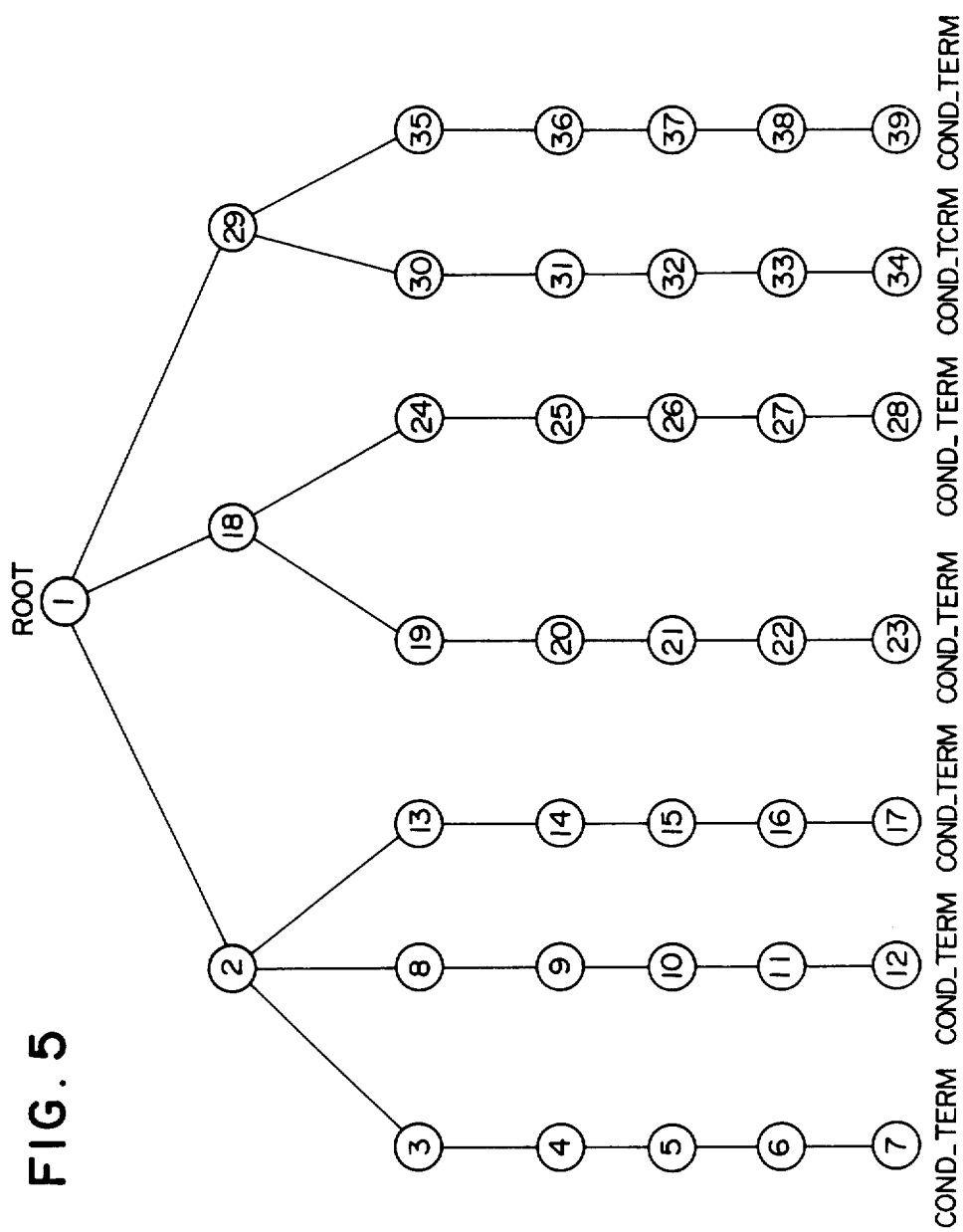
FIG. 5 is a schematic diagram illustrating an example of a network representation of conditions.

FIG. 5 is a schematic diagram illustrating an example of the network which comprises a ROOT node 1 at the top thereof, terminal nodes, namely, COND-TERM nodes ⑦, ⑫, ⑰, ㉓, ㉘, ㉞Ⅰ, and ㊴ ; and check nodes ②, ③, and ㉙ corresponding to the condition clauses in the condition.

The condition is judged as follows. The token is passed through all the branches of the ROOT node. In a check node, the received token is checked against the condition to determine whether the token satisfies the condition or not. If this is the case, the token is transferred to the next node; otherwise, the processing is stopped. When the token reaches a COND-TERM node, the condition described in the COND-TERM node is assumed to be satisfied. For example, if the check node conditions of the nodes ②-⑥ satisfied and the token reaches the COND-TERM node ⑦, the condition associated with the condition name stored in the node ⑦ is judged to have been satisfied. In the condition judge system according to the present invention, the nodes such as node ②-⑥ are automatically rearranged to maintain the network efficiency.

First, the processing modes of the condition judge system will be described. In the ordinary mode, the node processing information is not collected and the network is processed according to the prior art method described above. In the log mode, even if a condition stored in a check mode is not satisfied, the token is passed to the next node because the node processing information must be obtained for all nodes. The normal and log modes are changed at a predetermined interval.

FIG. 6 is an explanatory diagram demonstrating a format of the node processing information gathered in the log mode. Column data 20 includes the node processing information of the check nodes when pump A is passed as a token name through the network. When a condition stored in a check node is satisfied, a period of time required for the processing is stored as the node processing information. For example, it can be seen from this diagram that a period of time, 5 has been elapsed for the token, pump A to be judged to satisfy the condition of node ②. On the other hand, if the condition stored in the check node is not satisfied, a value obtained by multiplying $-1$ by the time required for the processing is registered as the node processing information. For example, it can be seen from the diagram that a period of time=5 has been elapsed for the token=pump A to be judged not to satisfy the condition of node ④.

In the log mode, the node processing information is stored for all tokens passed through the network. FIG. 5 shows that the tokens of pump A, turbine C, and turbine B are passed in this order through the network after the log mode is set.

Next, a description will be given of a method for determining the favorable hierarchic relationships between nodes by use of the node processing information.

For convenience of description, the following items are defined.

$$N = \{n_1, n_2, \ldots, n_m\}$$

where, N is a set of nodes $n_i$.

$$O = \{o_1, o_2, \ldots, o_n\}$$

where, O is a set of the tokens $o_n$ passing through the network in the log mode.

$$I = (i, k)$$

where, I is the node processing information obtained when a token $o_k$ associated with a node $n_i$ is processed.

$$P = (i, j)$$

where, P is the level of favorableness of a condition that a node $n_i$ is located at a the level higher than level of a node $n_j$.

For example, these items of FIG. 6 are N={②, ③, ④, ⑤, ⑥ ...}, O={pump A, turbine C, turbine B, pump B, pump C, ...}, I (1, 1)=5, I (1, 2)=1, I (1, 3)=6, and so on.

FIG. 7 is a flowchart illustrating a method for obtaining P (i, j) from I (i, k). First, N for which the hierarchic relationships are to be changed for an improved efficiency is set (processing step 30); for example, N=} ②, ③, ④, ⑤, ⑥}. P (i, j) is calculated for all pairs of $n_i$ and $n_j$ constituting N and satisfying i<j (processing step 31), where the pairs include (②, ③), (②, ④), (②,⑤), (②, ⑥), (③, ④), (③, ⑤), (③, ⑥), (④, ⑤), (④, ⑥), and (⑤, ⑥).

For each pair, ev representing P (i, j) is first cleared and a favorable relationship ev' related to each token is added (processing steps 30-40). The obtained value P (i, j) is multiplied by −1 and the resultant value is represented as P (j, i) (processing step 41). The value of P (i, j) is thus calculated.

For example, assuming O {pump A, turbine C, turbine B, pump B, pump C}, the value of P (②, ③) is calculated as follows.

Set ev=φ (processing step 32). Repeat the following processing steps for all values of O (processing step 33).

For pump A, ev-ni=5 and ev-nj=2 (step 34) and both values are positive (step 35); consequently, ev' is equal to φ. The value of ev' indicates the favorableness of a condition that node ② is located at a level higher than a level of node ③. The value of ev' is calculated for all values of O and the resultant values are added to each other so as to obtain the value of ev, which is considered to represent the comprehensive favorableness of the condition that node ② located at a higher level with respect to the level of node ③. P (②, 3 ) and P (③, ②) are thus expressed as ev and −1 * ev (processing step 41).

FIG. 8 is a schematic diagram illustrating the results of the processing. A value 51 is 10, which stands for P (③, ②), namely, the favorableness of the condition that node ③ is located at a level higher than a level of node ② is 10.

Using a table like the table of FIG. 8 indicating the favorable hierarchic relationships between nodes, a method for determining an efficient arrangement or construction of nodes will be described.

A value obtained by totaling the row data of a node is assumed to be the favorableness of the condition that the node is located at the highest position. This value is calculated for all nodes. In FIG. 6, the values are obtained as follows.

Node ② −10−8−9−11=−38
Node ③ 10+3+1−5=9
Node ④ 8−3+2−1=6
Node ⑤ 9−1−2−7=−1
Node ⑥ 11+5+1+7=24

Based on this results, node ⑥ is judged to be located at the highest position. Next, the row data and the column data associated with node ⑥ are removed from the table of FIG. 6, and the operation described above is achieved on the resultant table as follows.

Node ② −10−8−9=−27
Node ③ 10+3+1=14
Node ④ 8−3+2=7
Node ⑤ 9−1−2=6

Consequently, node ③ is located at the second highest position. Nodes ④, ⑤, and ② follow node ③ in this order.

As a result, the order of ②, ③, ④, ⑤, and ⑥ is changed to be an order of ⑥, ③, ④, ⑤, and ②. When the tokens of pump A, turbine C, turbine B, pump B, and pump C are passed through the network, the time required for the tokens to flow through the nodes ordered as ②, ③, ④, ⑤, and ⑥ is 38, whereas the time required for the tokens to pass through the rearranged nodes is reduced to 18, that is, the processing speed is about 2.1 times the processing speed developed on the nodes in the original order.

According to the embodiment of the present invention, the following effect is obtained.

1. Even if the writer of conditions describes the condition without considering the order of the condition clauses, an efficient processing can be achieved, which reduces the burden imposed on the condition writer.

2. The normal mode and the log mode are exchanged at a predetermined interval, and hence even if the object is changed and the ratios at which the nodes are satisfied are varied, an efficient network can be constructed in any cases because the network is dynamically reconstructed by use of the node processing information.

3. Although the present method using a table containing the favorable hierarchic relationships between nodes does not guarantee the optimal solution, the problem that the volume of calculations is abruptly increased due to the problem of combination has been solved, which enables to calculate an efficient arrangement of nodes at a higher speed.

According to the present invention, an efficient network reconstruction is possible by use of the node processing information of the network; consequently, the ordering of condition clauses conventionally achieved by the writer of conditions is unnecessitated and hence the writer is relieved from such a burden; furthermore, the node processing information of the network is collected at a predetermined interval and the network is more efficient based on the node processing information. This provides an efficient network which can be maintained even if the object of a condition description is changed and the volume of processing of each node and the satisfaction ratios are varied as a result.

We claim:

1. A method for dynamically reconstructing a network in a system in which a determination of whether or not a composite condition for an object data including a data name and at least a pair of an attribute name and an attribute value is satisfied based on network nodes representing clauses of the composite condition, said network nodes being sequentially processed beginning with a node corresponding to the highest position in the network, comprising the steps of:

collecting node processing information when said composite condition is determined to be satisfied; and dynamically reconstructing the network basded on the collected node processing information.

2. A method according to claim 1, wherein said step of dynamically reconstructing the network includes a step of referencing a table which represents favorableness for hierarchic relationships between the nodes.

3. A method according to claim 1 wherein said node processing information includes information related to a processing volume of each node and information related to a ratio at which a condition described in each node is satisfied.

* * * * *